Figure 1:
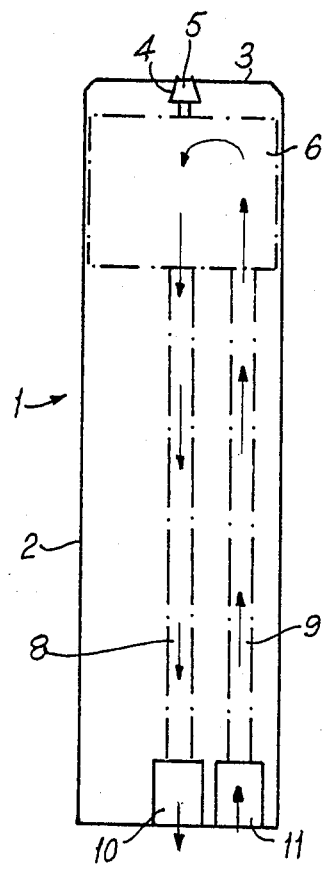

United States Patent [19]

McCormack

[11] Patent Number: 4,546,921
[45] Date of Patent: Oct. 15, 1985

[54] LIQUID FUEL BURNER

[75] Inventor: Wallace McCormack, Southampton, United Kingdom

[73] Assignee: Credfeld Camtorc Limited, Portsmouth, United Kingdom

[21] Appl. No.: 456,077

[22] PCT Filed: Apr. 29, 1982

[86] PCT No.: PCT/GB82/00128
§ 371 Date: Dec. 27, 1982
§ 102(e) Date: Dec. 27, 1982

[87] PCT Pub. No.: WO82/03906
PCT Pub. Date: Nov. 11, 1982

[30] Foreign Application Priority Data

Apr. 30, 1981 [GB] United Kingdom ............... 8113351

[51] Int. Cl.$^4$ ............................................. B05B 9/00
[52] U.S. Cl. ........................... 239/125; 137/625.43; 239/132.5; 239/571; 251/206; 251/208
[58] Field of Search ............... 239/125, 132.5, 571; 137/625.43; 251/206, 207, 208

[56] References Cited

U.S. PATENT DOCUMENTS 1,495,870  5/1924  O'Donnell .
2,247,227  6/1941  Findley ............................ 251/86
2,263,913 11/1941  Bargeboer ........................ 239/125
2,737,976  3/1956  Clack ........................... 137/625.43
2,852,040  9/1958  Deardorff ...................... 137/625.43
4,327,758  5/1982  Uhlmann ........................... 251/208

FOREIGN PATENT DOCUMENTS 1401791 11/1968  Fed. Rep. of Germany .
 691813 10/1930  France ............................ 251/208
 389811  3/1965  Switzerland .
 681800 10/1952  United Kingdom ............... 239/125
 883032 11/1961  United Kingdom ........... 137/625.43
1549100  4/1977  United Kingdom .

Primary Examiner—Andres Kashnikow
Assistant Examiner—Michael J. Forman
Attorney, Agent, or Firm—Howson and Howson

[57] ABSTRACT

In a liquid fuel burner of the spill return type, comprising an atomizer 4 for discharging liquid fuel and a rotary change-over valve 25 for conditioning the burner into a "circulate" mode (FIG. 1) in which no fuel is discharged from the atomizer 4 but circulates through the burner housing 2 and a "fire" mode (FIG. 2) in which liquid fuel issues from the atomizer 4, the rotary change-over valve 25 is adjustable into a plurality of different positions providing different rates of discharge of fuel from the atomizer 4 when the burner is conditioned into its "fire" mode.

5 Claims, 10 Drawing Figures

LIQUID FUEL BURNER

This invention relates to a liquid fuel burner of the kind comprising a valve housing, a burner unit including an atomiser for liquid fuel, ducting for conveying liquid fuel between the valve housing and the atomiser and an atomiser control valve movable in response to flow of liquid fuel in a first direction through said ducting to close said atomiser and return liquid fuel from the atomiser to the valve housing and movable in response to flow of liquid fuel in a second direction through said ducting to open said atomiser to allow at least some of the liquid fuel conveyed to the atomiser to be discharged therefrom and to return any surplus liquid fuel to the valve housing, inlet and outlet passages in said valve housing for conveying liquid fuel into and from the valve housing, and a rotary change-over valve in the valve housing which is turnable into different positions to condition the burner for flow of liquid fuel from said inlet passage through said ducting in either said first direction or said second direction. In order to simplify the ensuing description, such liquid fuel burners will be called "fuel burners of the kind referred to".

Fuel burners of the kind referred to, which are known as spill return burners, have been known for many years, a typical example being described in British Patent Specification No. 681,800. They can operate in one of two modes, depending on the position of said change-over valve. When the latter is in its said first position, liquid fuel simply circulates through said ducting from the valve housing to the atomiser and back to the valve housing. The burner is then said to be in its "circulate mode", the object of circulating liquid fuel through the burner being to keep the burner unit, and particularly its atomiser, cool. When, on the other hand, the change-over valve is in its said second position, and liquid fuel is discharged from the atomiser, the burner is said to be in its "fire mode".

In order to vary the rate at which fuel is discharged from the atomiser when a fuel burner of the kind referred to is in its fire mode, it is known to provide the burner with a separate spill return valve which can be used to vary the proportion between the amount of fuel that is allowed to discharge from the atomiser and the amount that is returned from the atomiser to the valve housing.

The present invention aims to provide a fuel burner of the kind referred to and having means for varying the rate at which fuel can be discharged from the atomiser, which is of simpler construction compared with hitherto known fuel burners of this kind with separate spill return valves.

According to the invention, in a fuel burner of the kind referred to, said rotary change-over valve is turnable into a first position to condition the burner for flow of liquid fuel from said inlet passage through said ducting in said first direction, and is turnable into a plurality of further positions in each of which the burner is conditioned for flow of liquid fuel from said inlet passage through said ducting in said second direction, said further positions of the rotary change-over valve providing different rates of fuel discharge from the atomiser.

In a fuel burner in accordance with the invention, the roles played by the change-over valve and the separate spill return valve in the hitherto known fuel burners of the kind referred to are combined in a single rotary change-over valve.

The rotary change-over valve of a fuel burner in accordance with the invention may have a plurality of discrete further positions in each of which the rate of discharge of fuel from the atomiser is different compared with the remaining further position or positions. Alternatively, the rotary change-over valve may be infinitely variable so that the rate of discharge of fuel from the atomiser is infinitely variable between minimum and maximum rates of discharge.

The rotary change-over valve of a fuel burner in accordance with the invention may be formed as a part of the burner unit or it may be detachably secured to the burner unit. Alternatively, the change-over valve may be remote from the burner unit, being connected to the latter by suitable pipes which form part of the aforementioned ducting. Whichever arrangement is chosen, the rotary change-over valve may serve to control a single burner unit or a plurality of burner units.

Figure 2:
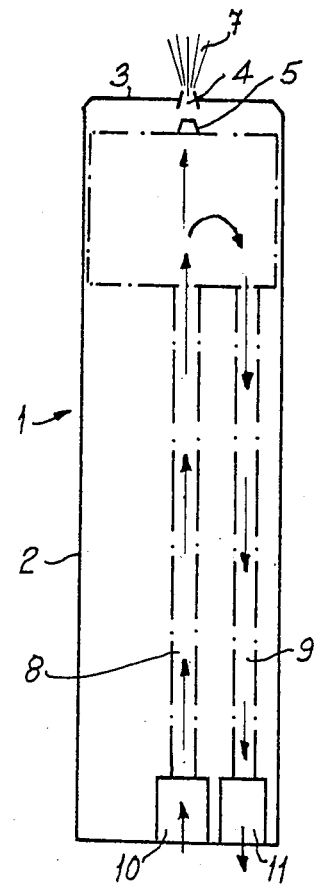
Figure 3:
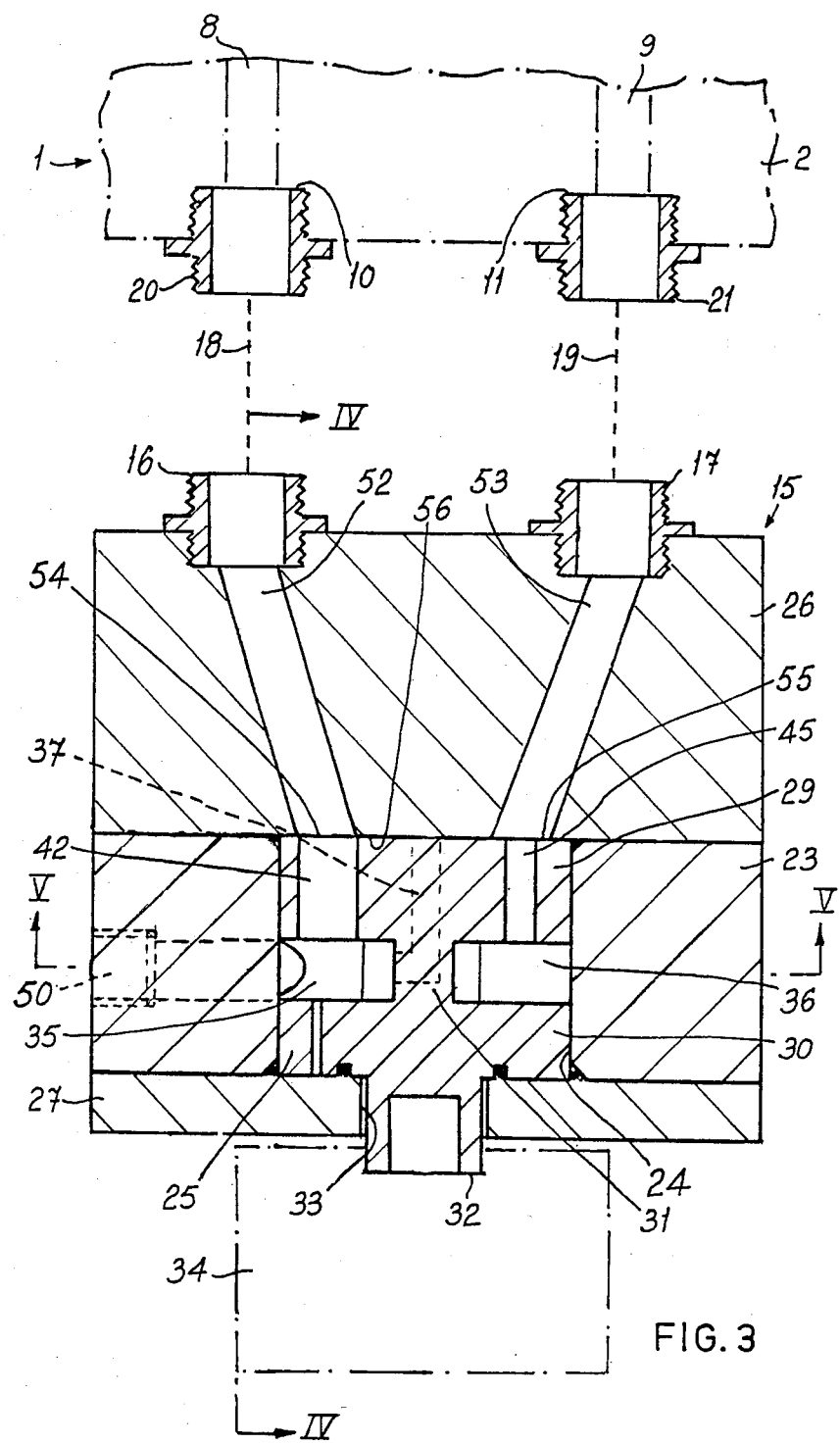
Figure 6:
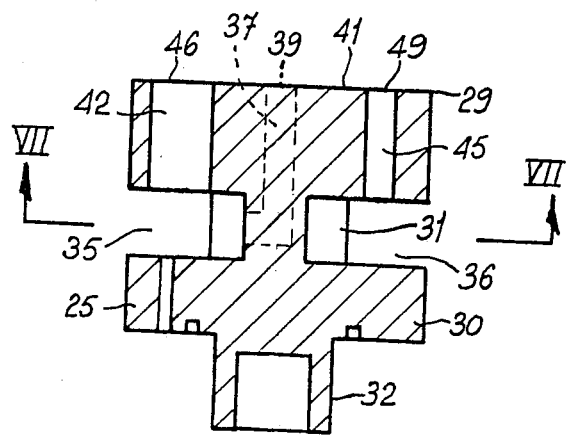
Figure 4:
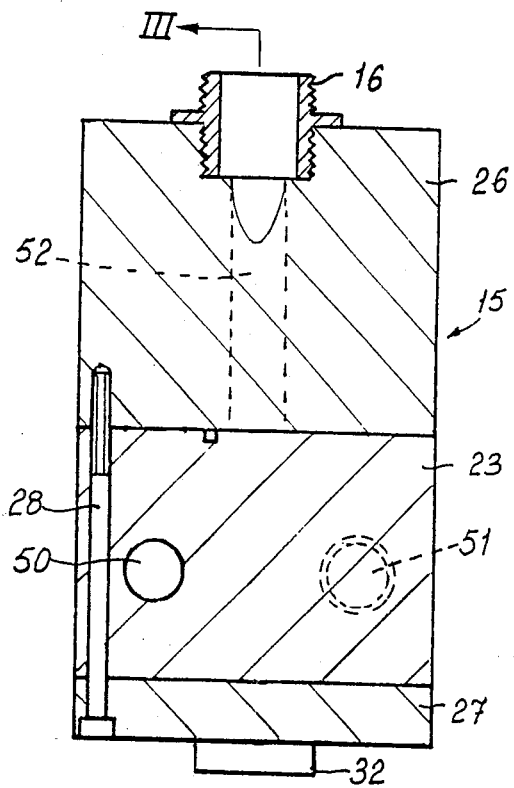
Figure 5:
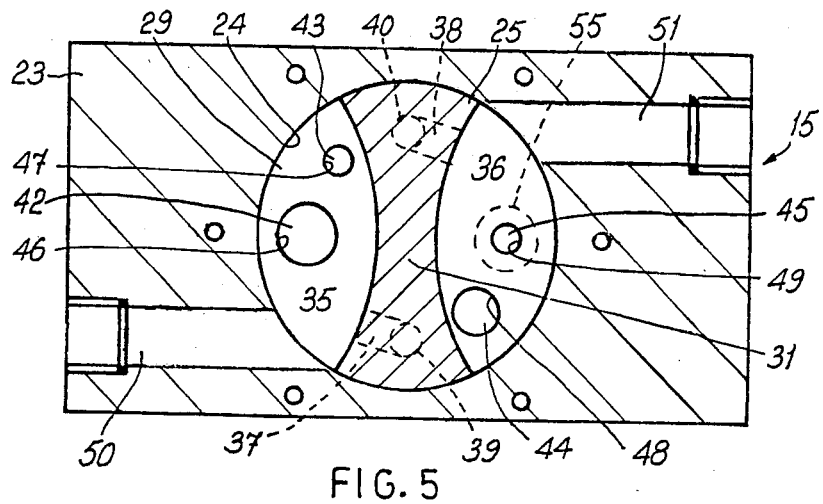
Figure 7A:
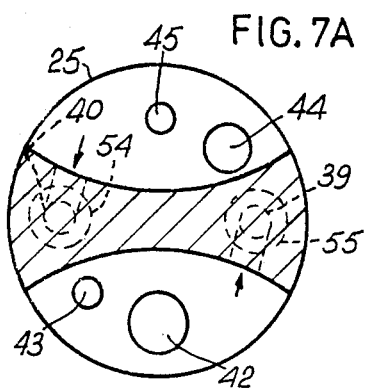
Figure 7B:
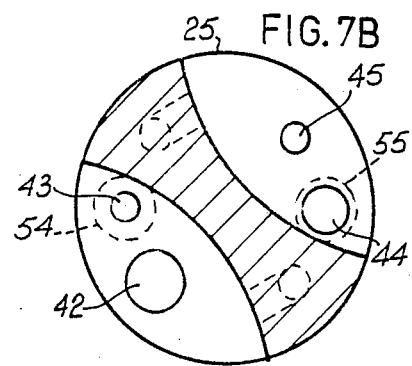
Figure 8A:
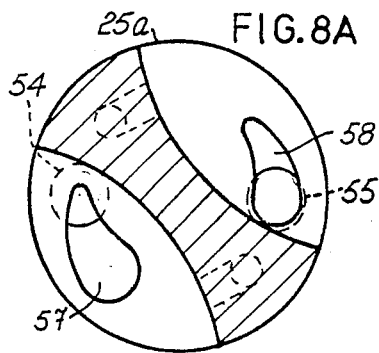
Figure 8B:
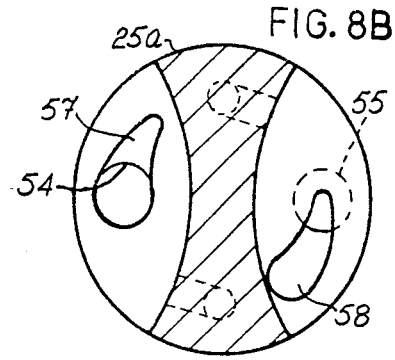

The invention will now be described, by way of example, with reference to the accompanying drawings, in which FIG. 1 is a purely schematic view of a burner unit of the kind employed in a liquid fuel burner in accordance with the invention, the burner unit being shown in the condition in which no fuel is issuing therefrom, FIG. 2 is a view similar to FIG. 1 but showing the burner unit in the condition in which fuel is issuing therefrom, FIG. 3 is a sectional view, taken on the line III—III of FIG. 4, of part of one embodiment of a liquid fuel burner in accordance with the invention, FIG. 4 is a sectional view, taken on the line IV—IV of FIG. 3, of the change-over valve of the embodiment of FIG. 3, FIG. 5 is a sectional view, taken on the line V—V of FIG. 3, of the change-over valve of the embodiment of FIG. 3, FIG. 6 is a sectional view of the valve member of the change-over valve of the embodiment of FIG. 3, FIGS. 7A and 7B are sectional views, taken on the line VII—VII of FIG. 6, showing the valve member in different angular positions in relation to passageways in the change-over valve, and FIGS. 8A and 8B are views similar to FIGS. 7A and 7B, respectively, relating to a modified embodiment of the change-over valve.

FIGS. 1 and 2 show a burner unit, generally designated by the reference numeral 1, which comprises a housing 2, an end plate 3 with an atomising orifice 4 therein, an atomiser control valve 5, actuating means 6 for moving the valve 5 between a position in which it closes the atomising orifice 4 (FIG. 1) and a position in which it is retracted from the atomising orifice 4 (FIG. 2) to allow liquid fuel to issue as a jet 7 from the orifice 4. Ducting, in the form of passageways 8, 9 within the housing 2, connects openings 10, 11, respectively, in the housing 2 to the actuating means 6. The latter is constructed, in a manner known per se, so as to move the valve 5, or allow it to move, to the position shown in FIG. 1 when liquid fuel under pressure flows into the opening 11 and along the passageway 9 to the actuating means 6 and then returns from the actuating means 6 to the opening 10 along the passageway 8. The burner unit 1 is then in the aforementioned "circulate" mode in which no fuel issues from the orifice 4 but simply circulates through the burner unit for the purpose of cooling the latter and especially those parts of the burner unit adjacent to its atomising orifice 4. In the "circulate"

mode of the burner unit 1, the opening 11 serves as an inlet opening for the liquid fuel and the opening 10 serves as an outlet opening for the fuel.

The actuating means 6 is further constructed, in a manner known per se, so as to move the valve 5 to the position shown in FIG. 2 when liquid fuel under pressure flows into the opening 10 and along the passageway 8 to the actuating means 6, enabling at least some of this liquid fuel to issue from the orifice 4 as the jet 7. Some of the fuel supplied to the actuating means 6 in this way can flow from the actuating means to the opening 11 of the housing 2 via the passageway 9, to provide a spill return of fuel from the burner unit. The burner unit 1 is then in the aforementioned "fire" mode, and the volume of fuel issuing from the orifice 4 is controlled by varying the amount of spill return to the opening 11. In this "fire" mode of the burner unit, the opening 10 serves as an inlet opening for the liquid fuel and the opening 11 serves as an outlet opening for the spill return fuel.

Burner units of the kind described above with reference to FIGS. 1 and 2 are extremely well-known and have been used for many years. Typical examples of such burner units are described in British Patent Specifications Nos. 681,800 and 997,781.

Clearly, to operate the burner unit of FIGS. 1 and 2 it is necessary to provide it with means for applying liquid fuel under pressure selectively to either the opening 10 or the opening 11, depending on whether the burner unit is required to function in its "fire" mode or its "circulate" mode. This is achieved by introducing a change-over valve between the source of the pressurised liquid fuel and the burner unit; see for example the valve 21 in FIG. 1 of Specification No. 681,800 or the interconnected valves 22, 23 in FIG. 1 of Specification No. 997,781. The change-over valves used for this purpose in hitherto known liquid fuel burners have been either rotary valves, like the aforesaid valve 21 of Specification No. 681,800, or linearly movable valves, as described in Pamphlet No. OF 595 issued by International Combustion Products Limited. It is known to use a single change-over valve to control a single burner unit or a plurality of burner units simultaneously, as mentioned in Specification No. 681,800. Furthermore, the change-over valve may be remote from the burner unit or units that it controls (as described in Specification No. 681,800) or it may be mounted on a burner unit (as described in the aforesaid Pamphlet No. OF 595).

In order to vary the quantity of fuel issuing from the orifice 4 when the burner unit if FIGS. 1 and 2 is in its "fire" mode, it is known to provide the burner unit with a separate spill return valve which varies the proportion between the quantity of fuel entering the opening 10 and the quantity of fuel leaving the opening 11. Such a separate spill return valve is shown in the line 29 in FIG. 1 of Specification No. 681,800, and a separate spill return valve 28 is shown in FIG. 3 of Specification No. 997,781.

In the liquid fuel burner in accordance with the present invention a combined change-over and spill return valve is provided, and one embodiment of such a fuel burner is shown in FIGS. 3–7B.

Referring first to FIG. 3, this shows a change-over and spill return valve, generally designated by the reference numeral 15, which comprises union connectors 16, 17 connected by means of pipes 18, 19, respectively (shown schematically by dotted lines) to union connectors 20, 21 mounted in the openings 10, 11, respectively, of the housing 2 of the burner unit 1 shown in FIGS. 1 and 2.

The valve 15 comprises a housing 23 with a circular cylindrical through bore 24 in which a valve member 25 is rotatably mounted. The housing 23 is secured between end plates 26 and 27, these end plates and the housing 23 being held together by bolts, such as the bolt 28 shown in FIG. 4.

The valve member 25 comprises two axially aligned, circular cylindrical plates 29, 30 joined together in spaced parallel relationship by a web 31, the plate 30 having a central boss 32 which projects through an aperture 33 in the end plate 27. The valve member 25 is turnable in the housing 23 by means of an actuator 34, shown purely schematically in FIG. 3 only, which is connected to the boss 32. The actuator 34 may be a simple manually operable handle, or a power-operated rotary valve actuator, for example a "Camtorc" actuator of the kind described in an article by D. Bowditch, entitled "Rotary Valve Actuators", in the April 1979 edition of "Power and Works Engineering".

The plates 29, 30 and the web 31 of the valve member 25 define between them two chambers 35, 36 in the valve member, which are situated on opposite sides of the web 31. Passageways 37, 38 (see FIGS. 5 and 6) formed in the web 31 and the plate 29 communicate at one end with the chambers 35 and 36, respectively, and at their other ends they have circular openings 39 and 40, respectively, in the surface 41 of the plate 29. Passageways 42, 43, 44 and 45 extend through the plate 29 in a direction parallel to the longitudinal axis of the valve member 25. The two passageways 42 and 43 communicate at one end with the chamber 35 and at their other ends they have circular openings 46 and 47, respectively, in the surface 41 of the plate 29. The two passageways 44 and 45 communicate at one end with the chamber 36 and at their other ends they have circular openings 48 and 49, respectively, in the surface 41 of the plate 29. The centres of the circular openings 46–49 lie on a circle having its centre on the longitudinal axis of the valve member 25. The openings 47 and 49 have the same cross-sectional area, the opening 48 has a larger cross-sectional area than the openings 47 and 49, and the opening 46 has a larger cross-sectional area than the opening 48.

The housing 23 is provided with an inlet duct 50 for liquid fuel under pressure and an outlet duct 51, each of these ducts opening into the wall of the bore 24 of the housing 23.

The end plate 26 has two ducts 52 and 53 therethrough. These ducts communicate at one of their ends with the union connectors 16 and 17, respectively, and at their other ends they have circular openings 54 and 55, respectively, in the surface 56 of the end plate 26. The centres of the openings 54 and 55 lie at diametrically opposite points of a circle having its centre on the longitudinal axis of the valve member 25, the diameter of the circle being equal to the diameter of the circle on which the centres of the openings 46–49 lie. The openings 54 and 55 both have the same cross-sectional area as the opening 46 in the surface 41 of the valve member 25.

When the valve member 25 is in the position shown in FIGS. 3 and 5, the openings 46 and 49 of the passageways 42 and 45, respectively, in the valve member 25, are aligned with the openings 54 and 55, respectively, of the ducts 52 and 53 in the end plate 26, and the ducts 51 and 50 communicate with the chambers 36 and 35, respectively, of the valve member 25. Liquid fuel supplied under pressure from a supply source (not shown) to the inlet duct 50 can therefore flow via the chamber 35, the passageway 42, the duct 52, the pipe 18 and the passageway 8 in the burner housing 2 to the actuating means 6 of the burner unit 1 of FIGS. 1 and 2. As previously described with reference to FIGS. 1 and 2, this places the burner unit in its "fire" mode, and there will be a spill return of fuel from the actuating means 6 via the passageway 9, the pipe 19, the duct 53, the passageway 45, the chamber 36 and the duct 51. The duct 51 is connected to the aforementioned fuel supply source for return of fuel thereto. Since the cross-sectional area of the passageway 45 in the valve member 25 is smaller than that of the duct 53 in the end plate 26, the amount of spill return from the actuating means 6 will be small and the burner unit 1 operates with maximum discharge of fuel from the orifice 4.

If now the valve member 25 is turned, by means of the actuator 34, so that it occupies the position shown in FIG. 7B in the housing 23, the ducts 50 and 51 still communicate with the valve chambers 35 and 36, respectively, but the openings 54 and 55 of the ducts 52 and 53, respectively, are now aligned with the openings 47 and 48 of the passageways 43 and 44, respectively. There will still be a flow of liquid fuel under pressure to the actuating means 6 via the passageway 8 in the housing 2, but owing to the smaller cross-sectional area of the passageway 43 compared with the passageway 42, and to the larger cross-sectional area of the passageway 44 compared with the passageway 45, there will be a reduction in the quantity of fuel discharged from the orifice 4 and a greater proportion of spill return of the fuel compared with the situation when the valve member 25 is in the position shown in FIGS. 3 and 5. The burner unit 1 now operates with minimum discharge of fuel from the orifice 4.

If now the valve member 25 is turned, by means of the actuator 34, so that it occupies the position shown in FIG. 7A, the ducts 50 and 51 still communicate with the valve chambers 35 and 36, respectively, but the openings 54 and 55 of the ducts 52 and 53, respectively, are now aligned with the openings 40 and 39 of the passageways 38 and 37, respectively. Liquid fuel under pressure now flows from the chamber 35 through the passageway 37, the duct 53, the pipe 19 and passageway 9 in the burner housing 2 to the actuating means 6 of the burner unit of FIGS. 1 and 2. As previously described with reference to FIGS. 1 and 2, this places the burner unit in its "circulate" mode, in which no fuel is discharged from the orifice 4.

From the above description it will be appreciated that the valve 15 acts as a combined change-over and spill return valve for the burner unit 1, providing high and low rates of fuel discharge from the orifice 4 or fuel circulation through the burner unit 1, without discharge from the orifice 4, depending on the angular orientation of the valve member 25 in the housing 23.

FIGS. 8A and 8B are cross-sectional view of a modified form of the valve member 25 of FIGS. 3–6. In the valve member 25a shown in FIGS. 8A and 8B, the passageways 42 and 43 of the valve member 25 are replaced by a single passageway 57 of pear-shaped cross-section, and the passageways 44 and 45 of the valve member 25 are replaced by a single passageway 58 of pear-shaped cross-section. With the valve member 25a in the housing 23 of FIGS. 3–5 in the position shown in FIG. 8B, the flow conditions for liquid fuel supplied under pressure to the inlet duct 50 will be the same as when the valve member 25 occupies the position shown in FIG. 3, namely there will be maximum fuel discharge from the orifice 4. If the valve member 25a is turned to the position shown in FIG. 8A, the flow conditions for liquid fuel supplied under pressure to the inlet duct 50 will be the same as when the valve member 25 occupies the position shown in FIG. 7B, namely there will be minimum fuel discharge from the orifice 4 and maximum spill return to the duct 51. If the valve member 25a is turned to different positions intermediate the limit positions represented by FIGS. 8A and 8B, the discharge from the orifice 4 can be set to different values between the minimum and maximum discharge rates. The valve member 25a therefore enables infinite variation of the rate of discharge of fuel from the orifice 4.

If the valve member 25a is turned to a position similar to that shown in FIG. 7A for the valve member 25, the burner unit 1 will operate in its "circulate" mode.

The liquid fuel burner in accordance with the invention is not, of course, limited to the particular embodiments described in detail above with reference to FIGS. 1–8B. For example, the combined change-over and spill return valve 15 may be arranged to control a plurality of burner units 1 simultaneously, in which case the pipes 18, 19 would have a plurality of branches leading to the union connectors 20, 21 of the various burner units.

Again, the combined change-over and spill return valve 15 need not be remote from the burner unit 1, but may be removably mounted directly on the burner housing 2. In this case the union connectors 16, 17, 20 and 21 and the pipes 18, 19 would be omitted, and the end plate 26 of the valve 15 would be provided with tubular bosses, communicating with the ducts 52 and 53 respectively, which would be received directly in the openings 10 and 11 of the burner housing 2. Each of these tubular bosses and the passageways 8 and 9 may be provided with spring-loaded valves, in a manner known per se, which automatically close the ducts 52 and 53 and the passageways 8 and 9 when the valve 15 is detached from the burner housing 2. This prevents fuel from dribbling from the ducts 52 and 53 or the passageways 8 and 9 when the valve 15 is detached from the burner housing. Suitable cooperating screw-threaded means would be provided on the burner housing 2 and the valve 15 for retaining the valve on the burner housing.

In this last-mentioned embodiment, the valve 15 mounted on the housing 2 of one burner unit may be used to control at the same time one or more other burner units 1. In this case pipes communicating with the ducts 52 and 53, respectively, would lead to the openings 10, 11, respectively, of the one or more other burner units 1.

In all of the embodiments of the liquid fuel burner described above with reference to the drawings, provision may be made for mounting throttling sleeves in one or more of the openings 46–49 and 54, 55 for the purpose of adjusting the discharge and spill return characteristics of the burner unit 1.

I claim:

1. A liquid fuel burner comprising:
a valve housing,
a burner unit including atomiser means for discharging liquid fuel from the burner unit, ducting means for conveying said liquid fuel between said valve housing and said atomiser means and atomiser control valve means movable to a first position in response to flow of said liquid fuel in a first direction through said ducting means to close said atomiser means and return said liquid fuel from said atomiser means to said valve housing and movable to a second position in response to flow of said liquid fuel in a second direction through said ducting means to open said atomiser means to allow at least some of the liquid fuel conveyed to said atomiser means to be discharged therefrom and to return any surplus liquid fuel to said valve housing, means comprising inlet and outlet passages in said valve housing, for conveying said liquid fuel into and from said valve housing, and rotary change-over valve means in said valve housing which communicates with said ducting means and with said inlet and outlet passages and which is turnable into a first position in which all the liquid fuel entering said inlet passage is directed to said burner unit for flow through said ducting means in said first direction, and is turnable into a plurality of further positions in each of which all the liquid fuel entering said inlet passage is directed to said burner unit for flow through said ducting means in said second direction, said further positions of said rotary change-over valve means providing different rates of fuel discharge from said atomiser means.

2. A liquid fuel burner according to claim 1, wherein said further positions are discrete ones in each of which the rate of discharge of fuel from the atomiser means is different compared with the remaining further position or positions.

3. A liquid fuel burner according to claim 1, wherein said rotary change-over valve means includes means infinitely variable through said further positions, for infinitely varying the rate of discharge of fuel from the atomiser means between minimum and maximum rates of discharge.

4. A liquid fuel burner according to claim 1, comprising means detachably securing said rotary change-over valve means to said burner unit.

5. A liquid fuel burner according to claim 1, wherein said rotary change-over valve means is remote from said burner unit, and comprising pipes connecting said burner unit to said rotary change-over valve means, said pipes forming part of said ducting means.

* * * * *